3,108,996
NEOMYCIN SULFATE PURIFICATION
Willard J. Haak, Kalamazoo, Mich., assignor to The Upjohn Company, Kalamazoo, Mich., a corporation of Delaware
No Drawing. Filed July 30, 1962, Ser. No. 213,141
6 Claims. (Cl. 260—210)

This invention relates to a chemical process and is particularly directed to a process for the reduction of siliceous matter in neomycin sulfate solutions by precipitating aluminum hydroxide in the solution at a pH of about 7 to 8 and then filtering to produce a clarified solution.

Heretofore, neomycin sulfate powders intended for preparation of sterile solutions have sometimes proved unsatisfactory for this purpose because of a turbidity which appeared in the reconstituted solutions. Turbidity, while not affecting the therapeutic efficacy of the solutions, has an adverse psychological effect. There is a need, therefore, for improved processes for clarifying neomycin sulfate solutions so that sterile powders prepared therefrom are free of this objection.

It has now been found in accordance with this invention, that clarifying the neomycin sulfate solution, utilized to prepare sterile powders, can be effected by precipitating aluminum hydroxide in the solution at about pH 7 to 8 prior to the final filter-clarification. It has been found that by precipitating aluminum hydroxide in the solution at about pH 7 to 8, siliceous materials are also precipitated and coalesced into clusters or flocs having sufficient size to be removed readily by filtration. By this procedure, silicon and components such as magnesium, boron, chromium, and the like, are substantially reduced in the solutions.

In carrying out the process of the invention, the final clarification step in the recovery of the neomycin sulfate is effected by adjusting the pH of the solution to about 7 to 8, adding aluminum sulfate and carbon thereto, and then clarifying the mixture by filtration. Advantageously, the filtration can be effected on various types of filtering means known to the art for example, on a filter press or on a rotary filter, followed by a final clarifying filtration, as, for example, on a Seitz filter. Any suitable filter-clarification can be used. The clarified solution thus obtained can be utilized for the preparation of sterile powders in the usual way.

Neomycin is ordinarily recovered from its fermentation beer by adsorption on ion exchange resins followed by elution with dilute sulfuric acid. The neomycin sulfate solution thus obtained is further purified by adsorption chromatography, for example, by passage through a carbon column. The percolate thus obtained, with or without further processing is then clarified, for example, by a Seitz filter and processed into sterile powders.

The process of the invention is particularly applicable to clarifying neomycin sulfate solutions which have been recovered by use of ion exchange resins followed by adsorption chromatography. Solutions thus obtained sometimes contain so much siliceous matter that it carries over into the final sterile powders causing the difficulty heretofore mentioned. By concentrating the eluates to a solids content of 15–25%, adding aluminum sulfate at a pH of about 7 to 8, and clarifying by filtration, siliceous impurities are removed to such a degree that turbidity is no longer encountered in sterile aqueous solutions reconstituted from sterile neomycin sulfate powders.

A preferred mode of the invention contemplates the addition of aluminum sulfate to a chromatographic column concentrate of neomycin sulfate at a pH of about 7 to 8. The amount of the aluminum sulfate added is not critical; an excess is not detrimental, provided that the amount used does not overload the equipment in the following step.

The pH range of the neomycin sulfate solution during the addition of the aluminum sulfate should be about pH 7 to 8. This range will insure the formation of the aluminum hydroxide flocs, and, further, prevent any suspended siliceous material from going into solution. Adjustment of the pH can be effected by bringing the neomycin sulfate solution into contact with or passing it over a strongly basic anion exchange resin. [Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene, cross-linked, if desired, with divinylbenzene, prepared by the procedure given on page 84 of Kunin, supra, and quaternizing with trimethylamine, or dimethylalkanolamine by the procedure given on page 97 of Kunin, supra. Anion exchange resins of this type are marketed under the trade-names Dowex 2, Dowex 20, Amberlite IRA–400 and IRA–401S, Duolite A–102, Permutit S–1, and Permutit A 300.]

The contact time of the aluminum sulfate with the neomycin sulfate solution is of some importance. Too short a time will not permit the complete clarification of the solution. The optimum contact time will depend upon the concentration of siliceous material in the solution. For example, when the starting material is a chromatographic column concentrate of neomycin sulfate containing 22% solids with 0.81% ash in the solid, and the hydrated aluminum sulfate is equivalent to 1 percent of the solid, the contact time consists of stirring the mixture from 1 to 2 hours and then allowing it to stand for 16 hours.

Ordinarily, the process of the invention is conducted at room temperature, but, if desired, a slightly elevated temperature can be used to facilitate the flocculation of the siliceous material. The filtration should be done at room temperature to reduce the solubility of the flocs.

The neomycin used in this process can be prepared according to U.S. Patent 2,799,620.

Though the present invention illustrates the addition of aluminum sulfate to a chromatographic column concentrate of neomycin sulfate, it is to be understood that the addition of aluminum sulfate to achieve the same purpose, i.e., clarification by removal of siliceous material, can be made at any other convenient step in the process of purifying the neomycin. Accordingly, the addition of aluminum sulfate to any neomycin sulfate solution in any neomycin recovery process is within the purview of this invention.

The following examples are given by way of illustrating the method of the present invention and are not to be construed as limiting.

Example 1

(a) A solution of 100 ml. of neomycin sulfate (solids content of 22%) from a chromatography column was adjusted to pH 7.5 with an anion exchange resin whose functional group was [—$CH_2N(CH_3)_2$—$CH_2CH_2OH$]$OH^-$. [The resin was prepared by chloromethylation of 20–50 U.S. mesh beads of polystyrene crosslinked with 1% of divinylbenzene and quaternization of the chloromethylated resin and dimethylethanolamine.] The resin was removed by filtration and the filtrate was treated with 0.2 g. of hydrated aluminum sulfate (analytical grade), stirred for about 2 hours and filtered.

(b) A solution of 100 ml. of neomycin sulfate (solids content of 22%) from a chromatography column was adjusted to a pH of 7.3 with an anion exchange resin as described above. The resin was removed by filtration and the filtrate was treated with 0.2 g. of aluminum sulfate (analytical grade), stirred for 2 hours during which approximately 2.2 g. of activated carbon was added, and filtered.

(c) A solution of 100 ml. of neomycin sulfate (solids content of 22%) from a chromatography column was adjusted to a pH of 7.5 as in part A. The resin was removed by filtration and the filtrate was treated with 0.2 g. of hydrated aluminum sulfate (analytical grade), stirred for 3 hours and permitted to stand overnight (16 hours) before filtration.

Spectrographic analyses of ashes on the solids obtained by freeze-drying the filtrates from the above three alumina treatment examples are as follows:

| Starting Material | Treatment I pH 7.5 | Treatment II pH 7.3 | Treatment III pH 7.5 |
|---|---|---|---|
| Very Large [1] Si | | | |
| Large Mg, Mn, Ca | Ca | | Ca |
| Medium Fe, B, Cr | B, Mg | Ca, Mg, B | Mg |
| Small | Si, Mn, Cr | Si, Mn, Cr | B, Si, Mn |
| Trace | | | Cr |

[1] Each level indicates about a 10 fold difference in concentration.

As shown above, the level of silica, which is primarily responsible for the turbidity of reconstituted sterile solutions of neomycin, was significantly reduced following treatment with aluminum sulfate.

I claim:
1. A process for the reduction of siliceous matter in neomycin sulfate solutions which comprises adjusting the pH of the solution to a range of 7 to 8, adding aluminum sulfate, and filtering to produce a clarified neomycin sulfate solution.
2. A process according to claim 1 wherein the pH is adjusted with an anion exchange resin.
3. A process according to claim 1 wherein the neomycin sulfate solution is a chromatographic column concentrate of neomycin sulfate.
4. A process for the reduction of siliceous matter in neomycin sulfate solutions which comprises adjusting the pH to about 7 to 8 and adding aluminum sulfate.
5. A process according to claim 4 wherein the neomycin sulfate solution is a chromatographic column concentrate of neomycin sulfate.
6. A process according to claim 4 wherein the pH is adjusted with an anion exchange resin.

References Cited in the file of this patent
UNITED STATES PATENTS

| | | |
|---|---|---|
| 2,698,821 | Wehrmeister | Jan. 4, 1955 |
| 2,793,978 | Wachtel | May 28, 1957 |